United States Patent
Khanna

(10) Patent No.: US 8,006,140 B2
(45) Date of Patent: Aug. 23, 2011

(54) DIAGNOSTIC SOLUTION FOR WEB SERVICE PROCESS FLOWS

(75) Inventor: Prateek Khanna, Bangalore (IN)

(73) Assignee: Oracle International Corporation, Redwood Shores, CA (US)

(*) Notice: Subject to any disclaimer, the term of this patent is extended or adjusted under 35 U.S.C. 154(b) by 170 days.

(21) Appl. No.: 12/436,039

(22) Filed: May 5, 2009

(65) Prior Publication Data

US 2010/0287418 A1    Nov. 11, 2010

(51) Int. Cl.
G06F 11/00    (2006.01)
(52) U.S. Cl. ............................. 714/45; 714/48
(58) Field of Classification Search .............. 714/25–27, 714/30, 43, 45, 48
See application file for complete search history.

(56) References Cited

U.S. PATENT DOCUMENTS

| | | | |
|---|---|---|---|
| 7,185,319 B2 | 2/2007 | Kaler et al. | |
| 7,430,596 B2* | 9/2008 | Jahromi et al. | 709/223 |
| 7,661,030 B2* | 2/2010 | Bozak et al. | 714/25 |
| 7,665,064 B2* | 2/2010 | Able et al. | 717/117 |
| 7,698,398 B1* | 4/2010 | Lai | 709/223 |
| 7,849,448 B2* | 12/2010 | Yunus et al. | 717/126 |
| 2005/0038855 A1* | 2/2005 | Martin et al. | 709/206 |
| 2005/0044197 A1* | 2/2005 | Lai | 709/223 |
| 2006/0005070 A1* | 1/2006 | Zimmer et al. | 714/5 |
| 2006/0129885 A1* | 6/2006 | Bozak et al. | 714/15 |
| 2006/0129988 A1 | 6/2006 | Calsyn et al. | |
| 2006/0150026 A1* | 7/2006 | Kolawa et al. | 714/38 |
| 2006/0277606 A1 | 12/2006 | Yunus et al. | |

FOREIGN PATENT DOCUMENTS

WO    WO 2005069823 A2    8/2005

OTHER PUBLICATIONS

"Troubleshooting", Xignite.com, Frequently Asked Questions, Hostname: Xignite21, Dec. 12, 2008, 2 pgs, http://preview.xignite.com/Support/FAQ.aspx?faqtype=Development&faqcat=Troubleshooting.
"CA Wily Web Services Manager", CA, Dec. 12, 2008, 1 pg., http://www.ca.com/us/products/product.aspx?id=8168.
Mindreef—Mindreef Products Overview, Mindreef SOAPscope Server product family, Dec. 12, 2008, 2 pgs., http://home.mindreef.com/products/soapscope-server/products.html.

(Continued)

*Primary Examiner* — Robert Beausoliel, Jr.
*Assistant Examiner* — Elmira Mehrmanesh
(74) *Attorney, Agent, or Firm* — Kilpatrick Townsend & Stockton LLP

(57) ABSTRACT

The embodiments presented herein provide systems, methods, and data structures for troubleshooting particular SOAP-based web service process flow. The SOAP request can be modified to include a diagnostic request in the SOAP request. Upon receiving the SOAP request, the application server can log actions related to the SOAP-based web service into the header of the SOAP response. The application server can complete the SOAP-based web service and send the SOAP response to the user. The user can then be presented with the logging in the header to facilitate the diagnosis of problems with the web service. Without causing unneeded logging at the application server, the present embodiments allow a user to diagnose and test web services.

17 Claims, 6 Drawing Sheets

OTHER PUBLICATIONS

Fabian, Jiri, "Using Mindreef's SOAPscope with Systinet's WASP", May 4, 2004, 4 pgs., http://www.webservices.org/vendors/hp/using_mindreef_s_soapscope_with_systinet_s_wasp?topic=governance&sub=, printed Dec. 12, 2008.

"Auditing and Tracing Messages", Oracle Application Server Advanced Web Services Developer's Guide, Dec. 12, 2008, pp. 1-12, http://database.in2p3.fr/doc/oracle/Oracle_Application_Server_10_Release_3/web.1013/b28975/auditlogging.htm.

"Soapalyzer: Easy troubleshooting of your SOAP Web Service," Dec. 12, 2008, 1 pg., 2007 Bluescraper Technology, http://www.soapalyzer.com.

* cited by examiner

DIAGNOSTIC SOLUTION FOR WEB SERVICE PROCESS FLOWS

BACKGROUND

The Internet provides functionality based on a Service Oriented Architecture. A Service Oriented Architecture allows a web service client application, such as an Internet browser, to send requests for services to an application server. In response to the request, the application server may execute an application or function that completes the task requested by the user. The results of the application or function may be sent back to the user. The Service Oriented Architecture underpins much of the functionality of the Internet, including shopping sites, gaming, etc. Generally, the request and response of this type of interaction are completed based on the Simple Object Access Protocol (SOAP).

However, as applications and services grow at the application servers, troubleshooting becomes difficult. Generally, problems can be witnessed. For example, a SOAP request for a web service may not return a SOAP result, the return of the SOAP result takes an inordinately long period of time, or the SOAP result is incorrect. To diagnose the problem, generally, a logging function is turned on that returns a log of all actions occurring at the application server. The log can contain entries of other web services, SOAP requests, or SOAP response that are not of interest in the troubleshooting. Further, the logging generally creates a large burden on the processing of the application server.

BRIEF SUMMARY

The embodiments presented herein provide systems, methods, and data structures for troubleshooting specific SOAP-based web services process flow. The SOAP request can be modified to include a diagnostic request in the SOAP request. Upon receiving the SOAP request, the application server can log actions related to the SOAP-based web service into the header of the SOAP response. The application server can complete the SOAP-based web service and send the SOAP response to the user. The user can then be presented the diagnostic information in the header to facilitate the diagnosis of problems with the web service.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Embodiments disclosed herein generally relate to diagnosing problems associated with web services or actions associated with SOAP messages. To target specific web services or actions associated with specific SOAP messages, the specific SOAP message that can request the specific web service may be modified to request diagnostic information. A request for diagnostic information can be written into the header of the SOAP message to create the modified SOAP message. A web service client application, when receiving a request for the web service, can send the modified SOAP message to a application server executing the web service.

The application server can read the modified SOAP header to determine that diagnostic information is requested. As the web service or application server execute one or more actions associated with the modified SOAP message or the web service, the application server can create a log of those one or more actions. After completing the requested web service or actions associated with the modified SOAP message, the application server writes the log into the header of a diagnostic SOAP response. The diagnostic SOAP response is a response from the requested web service. The application server can then send the diagnostic SOAP response back to the web service client application.

The web service client application can receive the diagnostic SOAP response and read the diagnostic information from the header. After reading the diagnostic information, the web service client application can present the diagnostic information to a user interface for a user. The system and methods described herein provide several advantages. The diagnostic information is targeted as specific web services or SOAP messages rather than a general log of all web service actions or all SOAP messages being created. Targeting the specific web service or SOAP message reduces or eliminates unnecessary logging or message traffic and speeds the diagnostic process.

Figure 1:
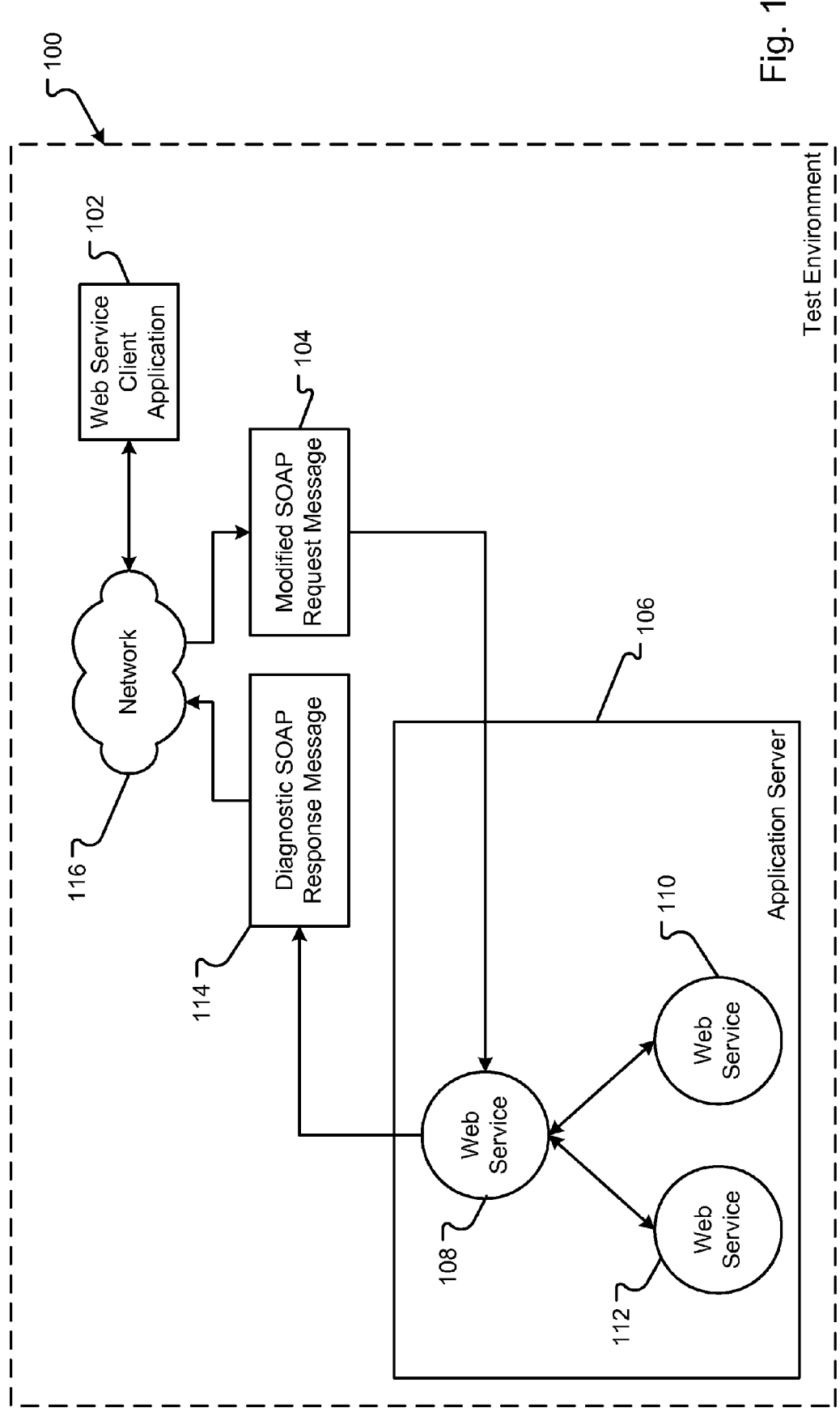
FIG. 1 is a block diagram of an embodiment of a test environment for diagnosing SOAP-based web services.

An embodiment of a test environment and/or system 100 for diagnosing errors or problems associated with SOAP-based web services is shown in FIG. 1. The test environment 100 can be an operational system connected to the Internet to provide web content with one or more components connected to the Internet. A test environment 100 may also be a developmental environment where one or more components are isolated from the Internet. Regardless, the test environment 100 can include a web service client application 102, a network 116, and a application server 106. The web service client application 102, the network 116, and the application server 106 can each be or include computing systems as described in conjunction with FIG. 6.

The web service client application 102 is a computing system that can execute software. The software can be any browser or other application that can generate a modified SOAP message. For example, the web service client application 102 includes Internet Explorer offered by Microsoft Corporation. The web service client application 102 is configured to request a web page and render the web page for a user on a user interface device. A tester can modify the code of the web page to include a request for the modified SOAP message 104. An explanation of changes to the SOAP request as changed in the web page is described in conjunction with FIG. 2A. The SOAP request requests a web service 108.

In response to a selection made in the web page or in rendering the web page, the web service client application 102 can generate the modified SOAP message 104 through the network 116. The web service client application 102 can also receive the diagnostic SOAP response message 114 from the application server 106 through the network 116. Beyond rendering or reacting to the SOAP response, the web service client application 102 can also provide the diagnostics in the diagnostic SOAP response message 114 to the user. The web service client application 102 can provide the diagnostics by displaying the information in a user interface or sending the information to a peripheral device, such as a printer.

Similar to the web service client application 102, the application server 106 is a computing system that can execute software and communicate with the web service client application 102. The application server software includes one or more web services 108, 110, and/or 112 and/or other applications to respond to web page requests and/or web service requests. A web service can receive the modified SOAP request message 104 from a web service client application 102 through a network 116. Output, such as data or another web page, from the web service may be encapsulated into a diagnostic SOAP response message 114 and sent back to the web service client application 102. An explanation of the diagnostic SOAP response message 114 is described in conjunction with FIG. 2B.

In response to receiving the modified SOAP request message 104, the application server 106 can call a web service 108 to fulfill the SOAP request 104. A web service 108 can be any software module or application operable to complete an action. For example, a web service 108 may take credit card information and process a sales transaction for a web merchant. The web service 108 can also be a member of a hierarchy and in communication with a second web service 110 or 112. A web service hierarchy can have parent and child web services. For example, web service 108 is the parent to the child web service 110. Further, web service 110 is a sibling to web service 112. More levels of the hierarchy than those shown in FIG. 1 are possible. The child web services 110 or 112 may be called by the parent web service 108 to complete actions necessary to respond to the modified SOAP request message 104.

The application server 106 can also respond to the request for diagnostics in the modified SOAP request message 104. In one embodiment, the application server 106 recreates a log of one or more actions that are associated with the modified SOAP request message 104 that are requested to be recorded in the modified SOAP request message 104. The log may be written into the diagnostic SOAP response message 114 before the web service response is sent to the web service client application 102. Alternatively, as each action is executed, the application server 106 can write a record of the action into the diagnostic SOAP response message 114. If the web service 108 communicates with other web services 110 or 112, the application server 106 can log diagnostics for actions executed by either web service 108, 110, or 112. Some of the actions logged are the receipt of the modified SOAP request message 104 and the transmission of the diagnostic SOAP response message 114. Regardless, the application server 106 sends the diagnostic SOAP response message 114 to the web service client application 102 with diagnostics related to the execution of the web services 108, 110, and/or 112.

The network 116 is any public or private network operable to transfer data or signals from one component to another. For example, the network 116 is a local area network (LAN), a wide area network, a wireless LAN, or the Internet. One or more devices, e.g., routers, transceivers, etc., compose the network 116. The components of the network 116 are configured to send the modified SOAP request message 104 and the diagnostic SOAP response message 114 between the application server 106 and web service client application 102.

Figure 2A:
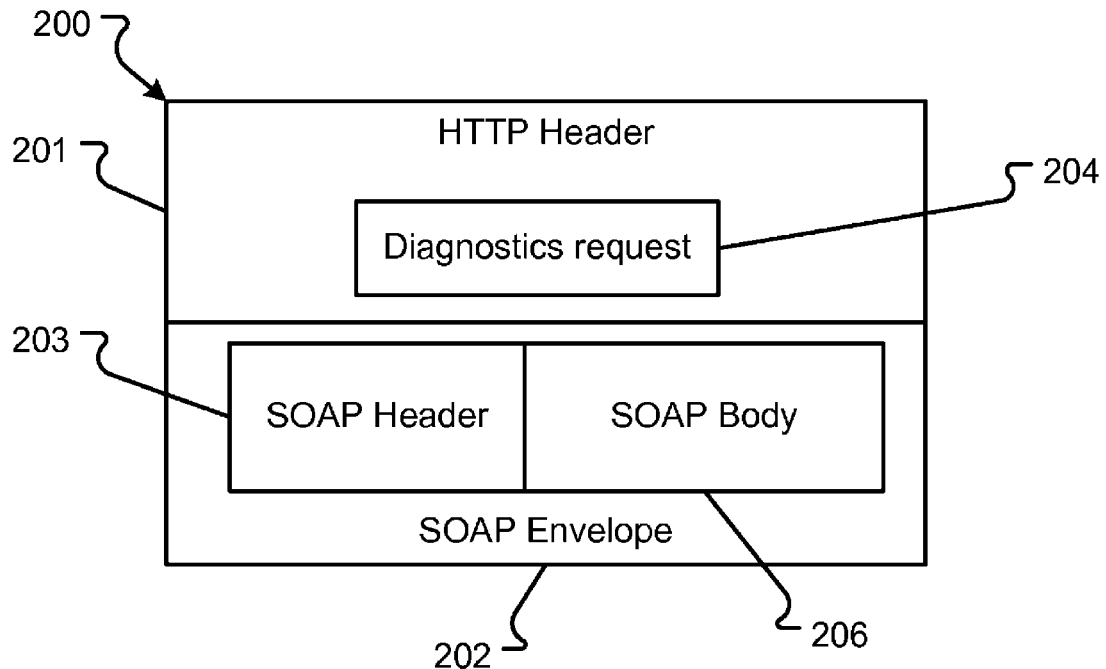
FIGS. 2A and 2B are block diagrams of embodiments of data structures for a modified SOAP request and a modified SOAP response.

An embodiment of a modified SOAP request message 200 is shown in FIG. 2A. The modified SOAP request message 200 can be the same or similar to the modified SOAP request message 104 (FIG. 1). The modified SOAP request message 200 can cause a processor at the application server 106 to log actions associate with the SOAP-based web service request. Each modified SOAP request message 200 may have one or more fields in the message. For example, the modified SOAP request message 200 can include a HTTP header 201, a SOAP envelope field 202, a SOAP header field 203, and a SOAP body field 206.

The HTTP header field 201 can include the data or information that is read to send and receive the HTTP message that includes the SOAP request. The HTTP header field 201 may include one or more of, but is not limited to, a header, a footer, an identifier, a requester identifier, a requester address, a sender identifier, a sender address, etc. The SOAP envelope field 202 can be the wrapper that defines the bounds of the modified SOAP request. A SOAP envelope field 202 may include one or more of, but is not limited to, a identifier for the envelope, an encoding designation, etc. A SOAP header field 203 can include information used to define the modified SOAP request message 200. This information can include one or more of, but is not limited to, an identifier of a web service, a request identifier, etc. The SOAP header field 203 may be a part of the SOAP envelope field 202.

A SOAP body field 206 can include data that defines the request for the web service 108 (FIG. 1) and/or data required by the web service 108 (FIG. 1). The application server 106 executes the requested web service in response to reading the data in the SOAP body field 206. One or more other items of information may be included in the SOAP body field 206 to request and perform the web service. Both the SOAP envelope field 202 and the SOAP body field 206 may be as known in the art. However, the modified SOAP request message 200 may also include a diagnostics request 204.

The diagnostics request 204 may be part of the HTTP header 201 or SOAP header field 203. The diagnostics request 204 can be coded and identified in the field to allow the application server 106 (FIG. 1) to recognize the need for diagnostics. A separate field may also be provided for the diagnostics request 204. If data is include in the separate field, the application server 106 (FIG. 1) can recognize diagnostics are requested.

A diagnostics request 204 can be a set bit or a flag that identifies the need for diagnostics and defines the request for diagnostics. The processor of the application server 106 executes logging of actions associated with the requested web service in response to reading the diagnostics request 204. In other instances, the diagnostics request 204 includes additional or different information. For example, the diagnostics request 204 can set a level of detail for the logging of diagnostics. The diagnostics can be at a server-level, e.g., actions associated with web server functions, or at a method-level, e.g., intra-web service actions associated with the execution of the web services. One level of diagnostics may include only the date and time record of reception of the modified SOAP request message 200 and of the transmission of the diagnostic SOAP response message 114 (FIG. 1). More detailed diagnostics may be requested that log intra-web service actions, for example, a date and time record of particular actions conducted by the web service 108 (FIG. 1) in response to the modified SOAP request message 200. The diagnostic request detail may parallel the detail levels for logging completed by a application server for all web service actions. For example, the diagnostic request 204 can include four levels of detail: none, trace, warning, and error. The level of detail can be selected and entered into the diagnostics request 204.

An example of a modified SOAP request message 200 may be as follows:

```
<!--------------------SAMPLE REQUEST---------------->
POST /StockQuote HTTP/1.1
Host: www.stockquoteserver.com
Content-Type: text/xml; charset="utf-8"
Content-Length: nnnn
SOAPAction: "Some-URI"
Diagnostics: TRACE
<SOAP-ENV:Envelope
  xmlns:SOAP-ENV="http://schemas.xmlsoap.org/soap/envelope/"
  SOAP-ENV:encodingSytle="http://schemas.xmlsoap.org/soap/
  encoding/">
  <SOAP-ENV:Body>
    <m:GetLastTradePrice xmlns:m="Some-URI">
      <symbol>DIS</symbol>
    </m:GetLastTradePrice>
  </SOAP-ENV:Body>
</SOAP-ENV:Envelope>
<!-------------------- END REQUEST ------------>
```

The example modified SOAP request message 200 and includes a header with a diagnostic request, "Diagnostics: Trace." The request defines the level of logging at the "Trace" level. When received at the application server 106, the application server 106 can read and interpret this entry as requiring logging for the request for the "GetLastTradePrice" web service. The processor of the application server 106 creates the diagnostic SOAP response message 208 in response to reading the diagnostic request 204.

The web service implementation can be updated in the manner below to provide diagnostic details regarding web service execution.

```
@WebMethod
Public int GetLastTradePrice(String symbol){
@Diagnostics(level="TRACE",message="Started Processing
GetLastTradePrice")
  .......................................
@Diagnostics(level="TRACE",message="Completed Processing
GetLastTradePrice")
}
```

The above example implementation for the web service includes one or more actions to be to be logged. The statement "@WebMethod" and "Public int GetLastTradePrice(String symbol) {" requests the initiation of the web service to be logged. Further, one or more actions to be logged can be designated in the request. For example, the statement "@Diagnostics(level="TRACE",message="Started Processing GetLastTradePrice")" requests that the start of the web service method be logged. Similarly, the statement "@Diagnostics(level="TRACE",message="Completed Processing GetLastTradePrice")" requests that the termination of the web service be logged. The processor of the application server 106 creates the diagnostic SOAP response message 208 with the associated logs in response to reading the diagnostic request(s) for the web service(s). In this manner the web service diagnostic request can also facilitate debugging at the intra-web service method level, i.e., within the web service application context.

Figure 2B:
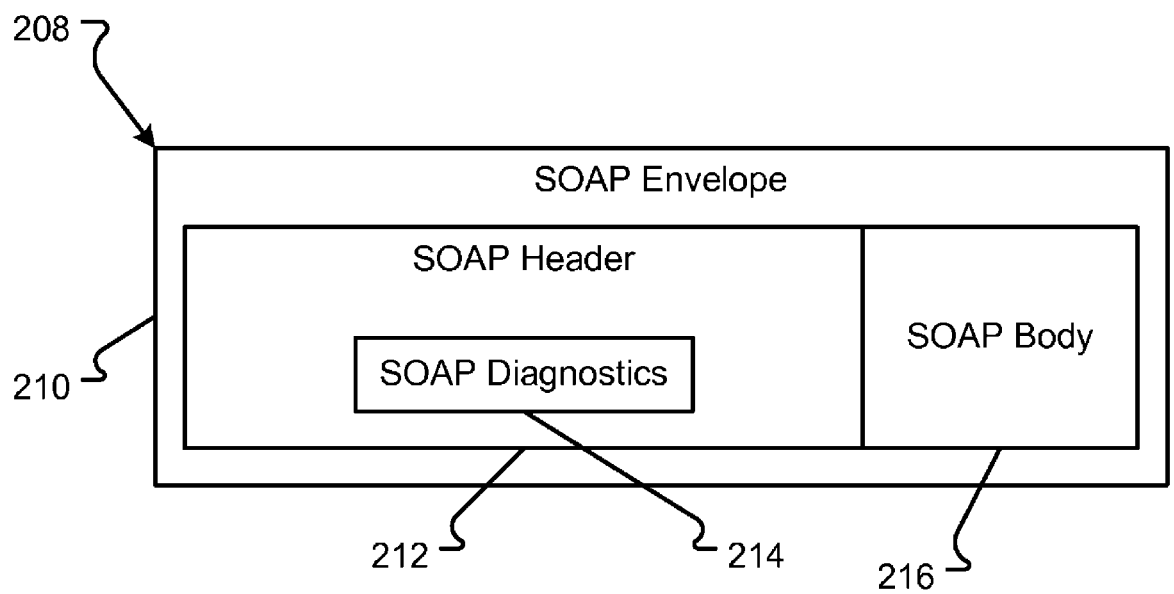

An example of a diagnostic SOAP response message 208 is shown in FIG. 2B. The diagnostic SOAP response message 208 can be the same or similar to the diagnostic SOAP response message 114 (FIG. 1). For example, the diagnostic SOAP response message 208 can include a SOAP envelope field 210, a SOAP header field 212, a SOAP diagnostics field 214 (which may be part of the SOAP header field 212), and a SOAP body field 216. The SOAP envelope field 210, similar to the SOAP envelope field 202, can be the wrapper that defines the bounds of the diagnostic SOAP response message 208. The SOAP envelope field 210 may include one or more of, but is not limited to, a header, a footer, an identifier, a requester identifier, a requester address, a sender identifier, a sender address, etc.

A SOAP body field 216 may include the response from the web service 108 (FIG. 1) and/or data provided by the web service 108 (FIG. 1) sent to the web service client application 102. One or more other items of information may be included in the SOAP body field 216 to respond to the web service request. A SOAP header field 212 can include information used to send or define the diagnostic SOAP response message 208. This information can include one or more of, but is not limited to, a header, a footer, an identifier, a requester identifier, a requester address, a sender identifier, a sender address, etc. The SOAP header field 212 may be a part of the SOAP envelope field 210. Each of the SOAP envelope field 210, SOAP header field 212, and the SOAP body field 216 may be as known in the art. However, the diagnostic SOAP response message 208 may also include diagnostics.

SOAP diagnostics 214 is part of the SOAP header field 212 of the diagnostic SOAP response message 208. In other embodiments, the SOAP diagnostics 214 may be part of the SOAP envelope field 202, the SOAP body field 206, or some other field. For example, the SOAP diagnostics 214 may be coded and identified to allow the web service client application 202 (FIG. 1) to recognize the diagnostics. A separate field may be provided for the SOAP diagnostics 214. If data is included in the separate field, the web service client application 202 (FIG. 1) can recognize the field as containing the diagnostics.

SOAP diagnostics 214 include the logged information about completed actions associated with the web service 108. For example, the SOAP diagnostics 214 can include a record for all actions that are performed and logged with the associated level of diagnostics. One level of diagnostics may include only the date and time record of reception of the modified SOAP request message 200 and of the transmission of the diagnostic SOAP response message 114 (FIG. 1). More detailed diagnostics may be requested that log a date and time record of particular actions conducted by the web service 108 (FIG. 1). The diagnostic request detail may parallel the detail levels for logging completed by a application server for all web service actions. For example, the diagnostic request 204 can include four levels of detail: none, trace, warning, and error. The level of detail can be selected and entered into the diagnostics request 204.

An example of a diagnostic SOAP response message 208 may be as follows:

```
<!--------------------SAMPLE RESPONSE---------------->
HTTP/1.1 200 OK
Content-Type: text/xml; charset="utf-8"
Content-Length: 1224
<SOAP-ENV:Envelope
 xmlns:SOAP-ENV="http://schemas.xmlsoap.org/soap/envelope/"
 SOAP-ENV:encodingSytle="http://schemas.xmlsoap.org/soap/
 encoding/"/>
<SOAP-ENV:Header>
<t:DiagnosticOutput xmlns:t="http://uri/">
[Friday November 07'2008 03:05:10(GMT+5.30)]Received SOAP
Request (Id: 12202) at the application server
[Friday November 07'2008 03:05:10(GMT+5.30)]Parsed SOAP Request
(Id: 12202) successfully
[Friday November 07'2008 03:05:11(GMT+5.30)]Created SOAP Request
(Id: 12314) for /StockDataAccessorService
...........
[Friday November 07'2008 03:05:14(GMT+5.30)]Received response from
/StockDataAccessorService
...........
[Friday November 07'2008 03:05:15(GMT+5.30)]Created response for
SOAP Request (Id: 12202)
[Friday November 07'2008 03:05:15(GMT+5.30)]Response for SOAP
Request (Id: 12202) sent to client
</t:DiagnosticOutput>
</SOAP-ENV:Header>
<SOAP-ENV:Body>
<m:GetLastTradePriceResponse xmlns:m="Some-URI">
<Price>34.5</Price>
</m:GetLastTradePriceResponse>
</SOAP-ENV:Body>
</SOAP-ENV:Envelope>
<!-------------------- END RESPONSE ------------>
```

The example diagnostic SOAP response message 208 includes a header with the diagnostic information, "<t: DiagnosticOutput>". The type of diagnostics logged is in response to the level of diagnostics requested in the above example modified SOAP request message 200. The application server 106 (FIG. 1) can log the events associated with the diagnostics and write the log into the diagnostic SOAP response message 208 before sending the diagnostic SOAP response message 208. In another embodiment, the application server 106 (FIG. 1) creates diagnostic SOAP response message 208 and writes the diagnostic records into the diagnostic SOAP response message 208 as the events occur.

Figure 3:
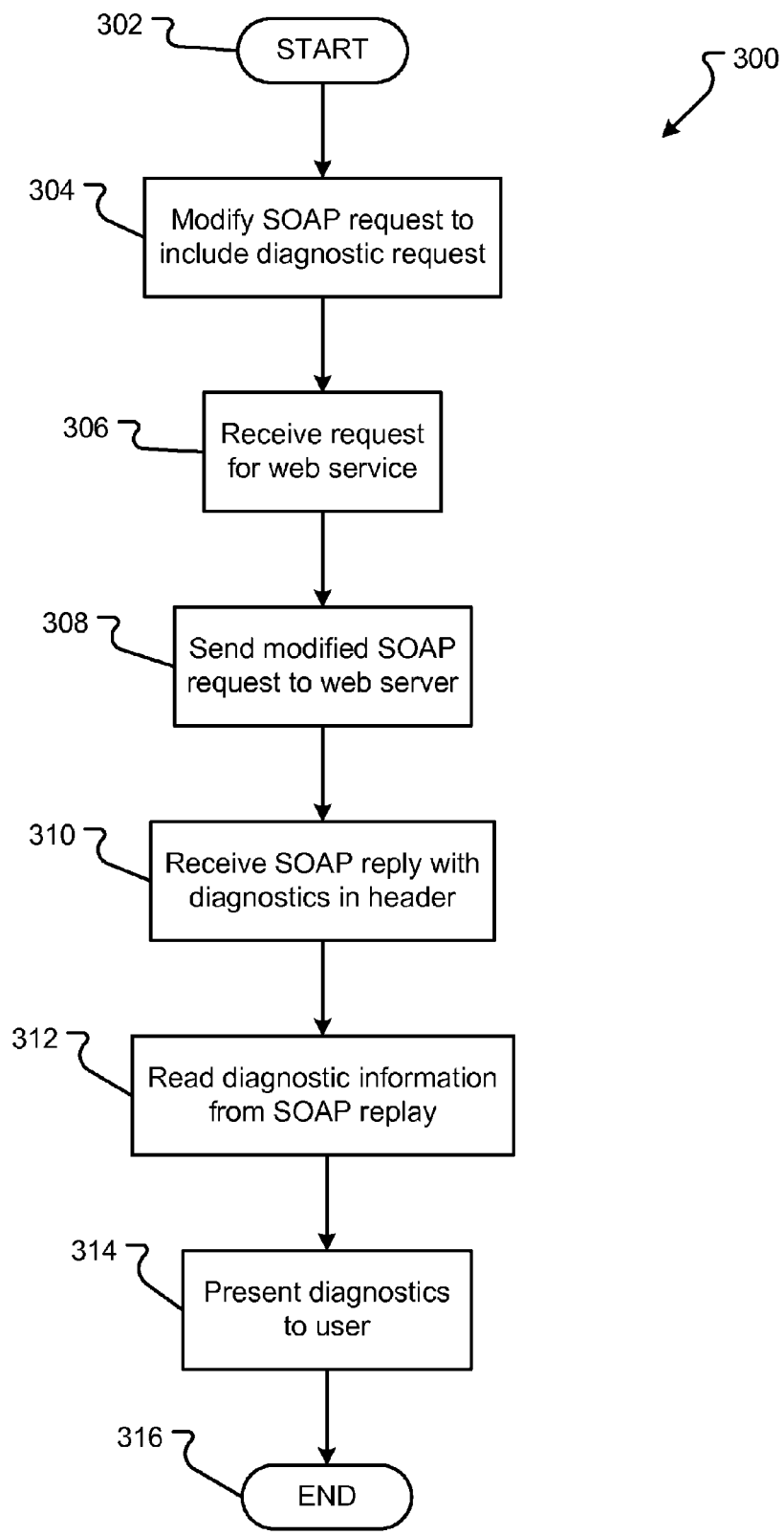
FIG. 3 is a flow diagram of an embodiment of a process for sending a modified SOAP request from and receiving a modified SOAP response at a user computer.

An embodiment of a method 300 executed at a web service client application 102 (FIG. 1) for diagnosing a web service 108 (FIG. 1) is shown in FIG. 3. In embodiments, the method 300 generally begins with a START operation 302 and terminates with an END operation 316. The steps shown in the method 300 may be executed in a computer system as a set of computer-executable instructions. While a logical order is shown in FIG. 3, the steps shown or described can, in some circumstances, be executed in a different order than presented herein. Further, the steps shown in FIG. 3 may only be a subset or may be substituted for other steps not shown in FIG. 3. The method 300 of FIG. 3 will be explained with reference to the drawings in FIGS. 1-2B.

A web service client application 102 receives a request to change the web service request. A request to receive diagnostics related to the web service is received. The web service client application 102 modifies the SOAP request for the web service 108 into a modified SOAP request to include the request for diagnostic in step 304. The web service client application 102 can write the diagnostic request, optionally with a selection for the level of diagnostics, into the modified SOAP request message 200, as shown in FIG. 2A. The diagnostic request may be written in to the header of the modified SOAP request message 200. The user can then call for the web page to invoke the web service.

A user may select the web page or a user interface device in the web page, such as a button. In response to the user selection, the web service client application 102 can receive a request for the web service 108 in step 306. In response to receiving request for the web service, the web service client application 102 sends the modified SOAP request message 104 to the application server 106 in step 308. The web service client application 102 addresses the modified SOAP request message 104 to the application server 106 and transmits the modified SOAP request message 104 over the network 116.

After the application server 106 acts on the modified SOAP request message 104, the web service client application receives the diagnostic SOAP response message 114 from the application server 106 in step 310. The diagnostic SOAP response message 114 is sent in response to the modified SOAP request message 200. The diagnostic SOAP response message 114 is sent to the web service client application 102 over the network 116. The diagnostic SOAP response message 114 can be similar to the diagnostic SOAP response message 208 and the web service client application 102 can read the diagnostic SOAP response message 208 in step 312. Upon locating the diagnostic information field 214, the web service client application 102 reads the diagnostic information 214, for example, from the header of the diagnostic SOAP response message 208. The diagnostic information can include a log of one or more actions executed by and associated with the requested web service 108. The web service client application 102 can present the diagnostic information 214 to a user in step 314. In an embodiment, the web service client application 102 provides the diagnostics to a user interface, printer, or other device.

Figure 4:
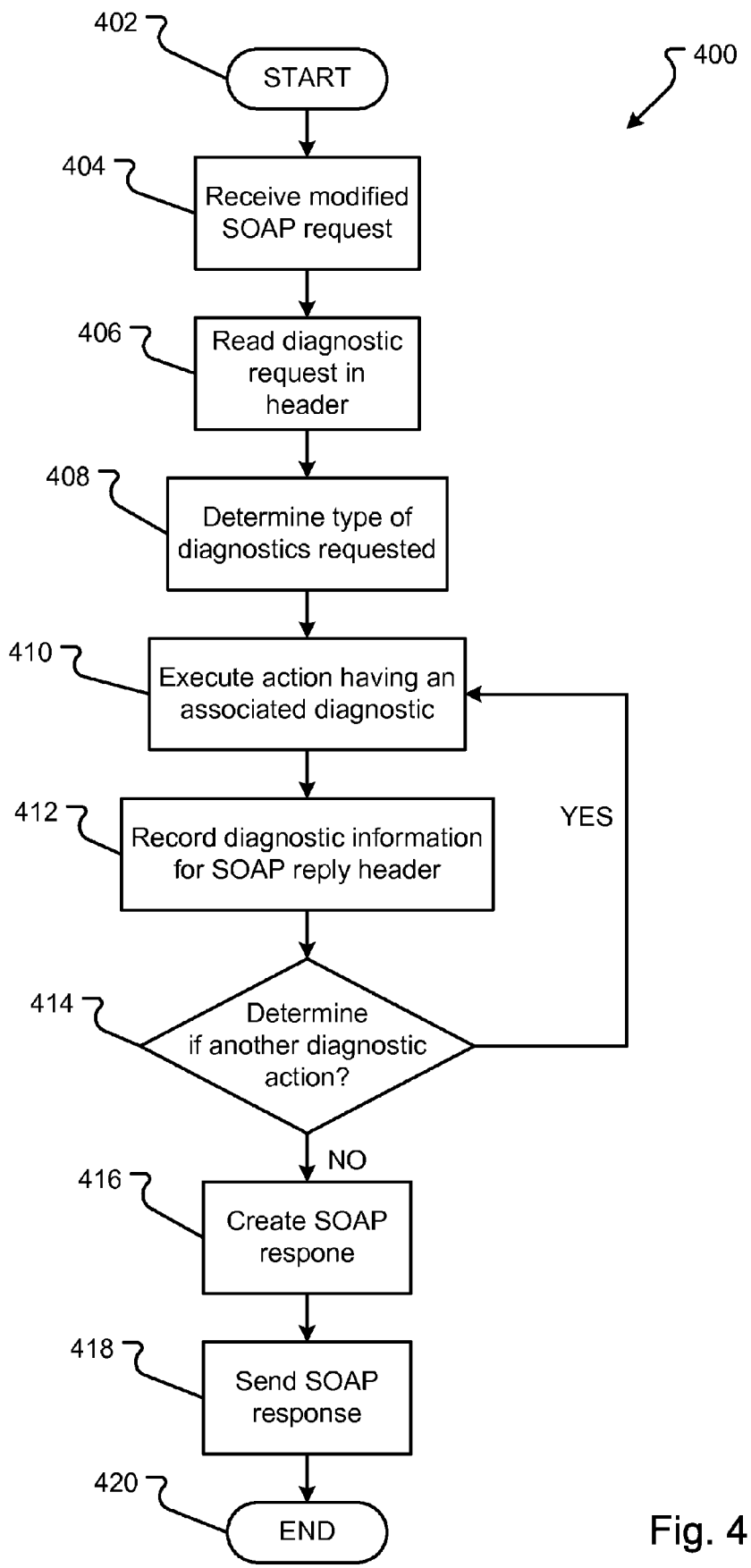
FIG. 4 is a flow diagram of an embodiment of a process for receiving a modified SOAP request at and sending a modified SOAP response from a application server computer.

An embodiment of a method 400 executed at a application server 106 (FIG. 1) for diagnosing a web service 108 (FIG. 1) is shown in FIG. 4. In embodiments, the method 400 generally begins with a START operation 404 and terminates with an END operation 420. The steps shown in the method 400 may be executed in a computer system as a set of computer-executable instructions. While a logical order is shown in FIG. 4, the steps shown or described can, in some circumstances, be executed in a different order than presented herein. Further, the steps shown in FIG. 4 may only be a subset or may be substituted for other steps not shown in FIG. 4. The method 400 of FIG. 4 will be explained with reference to the drawings in FIGS. 1-2B.

A application server 106 receives a modified SOAP request message 104, similar to the modified SOAP request message 200, through a network 116 from a web service client application 102 in step 404. The application server 106 can locate the diagnostic request 204 in the modified SOAP request message 200 by identifying a field or an identifier for the diagnostic request 204. The application server can then read the request for diagnostics 204 from the modified SOAP request message 200 in step 406. Based on the diagnostic request, the application server 106 can determine the type of diagnostics requested in step 408. For example, if the diagnostic request 204 has a level of diagnostics selected, the application server 106 can read the request for the level of detail for the logging.

The application server 106 can then read the web service request in the SOAP body 206 and execute the web service 108. The application server 106 can execute the web service 108 and/or one or more actions associated with the web service 108. When an action is executed, the application server 106 can determine if the action is associated with a diagnostic. In other words, the application server 106 determines if the action executed is to be recorded at that request level of diagnostics. The web service 108 can then execute the action associated with a requested diagnostic in step 410.

As the action is executed and in response to the action execution, the application server 106 can record the diagnostic information associated with the executed action for the SOAP reply header 212 in step 412. A log may be recorded by the application server 106 as the web service 108 executes actions. The log may be created directly in the diagnostic SOAP response message 208 or separately and written later in the diagnostic SOAP response message 208. A web service 108 executes one or more actions until providing a response to the modified SOAP request message 104. The actions may be a call to another web service 110 and/or 112. The web service 108 or application server 106 can determine if another action is associated with the diagnostic request 204 in step 414. As with the first action, the application server 106 can determine if a next action is associated with the level of diagnostics requested. If there is another action associated with the diagnostic request, the method 400 flows YES to execute step 410. If there is no other action associated with the diagnostic request and, optionally, the diagnostic SOAP response message 114 is ready to be sent, the application server 106 can create the diagnostic SOAP response message 208 in step 416.

The application server 106 can create the fields of the diagnostic SOAP response message 208. In embodiments, the fields were already created with the diagnostics 214 written into the diagnostic SOAP response message 208 as the actions were occurring. Alternatively, the application server 106 creates the diagnostic SOAP response message 208 and writes the diagnostic information 214 associated with the executed action(s) into the diagnostic SOAP response message 208. After the diagnostic SOAP response message 208 is created, the application server 106 addresses the diagnostic SOAP response message 208 to the web service client application 102 and sends the diagnostic SOAP response message 208 through the network 116 in step 418.

Figure 5:
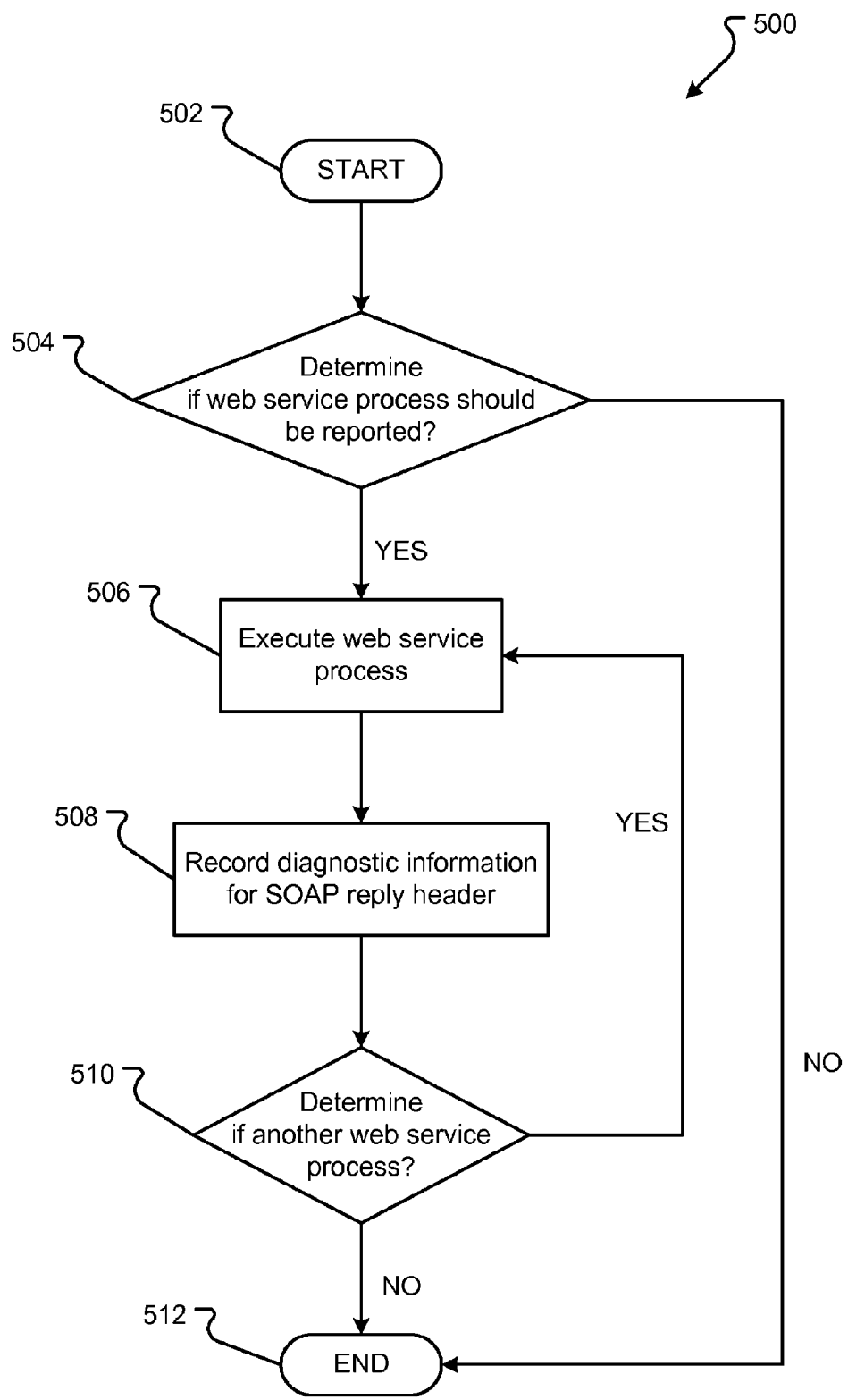
FIG. 5 is a flow diagram of an embodiment of a process for diagnosing and logging functions at the web service level.

An embodiment of a method 500 executed at a application server 106 (FIG. 1) for diagnosing a web service 108 (FIG. 1) is shown in FIG. 5. In embodiments, the method 500 generally begins with a START operation 502 and terminates with an END operation 512. The steps shown in the method 500 may be executed in a computer system as a set of computer-executable instructions. While a logical order is shown in FIG. 5, the steps shown or described can, in some circumstances, be executed in a different order than presented herein. Further, the steps shown in FIG. 5 may only be a subset or may be substituted for other steps not shown in FIG. 5. The method 500 of FIG. 5 will be explained with reference to the drawings in FIGS. 1-2B.

The application server 106 can execute the web service 108, and the web service 108 can execute one or more actions. When a first, second, third, or other action is executed, the application server 106 can determine if the action is associated with a diagnostic and the web service requested in step 504. In other words, the application server 106 determines if the action to be executed is to be recorded at that requested level of diagnostics. If the action is associated with the web service and/or to be logged, the web service 108 can execute the action associated with a requested diagnostic in step 506.

As the action is executed and in response to the action execution, the application server 106 can record the diagnostic information associated with the action for the SOAP reply header 212 in step 508. A log may be recorded by the application server 106 as the web service 108 executes actions. The log may be created directly in the diagnostic SOAP response message 208, or separately, and written later in the diagnostic SOAP response message 208. A web service 108 executes one or more actions until providing a response to the modified SOAP request message 104. The actions may be a call to another web service 110 and/or 112. The web service 108 or application server 106 can determine if another action is associated with the diagnostic request 204 in step 510. As with the first action, the application server 106 can determine if a next action is associated with the level of diagnostics requested. If there is another action associated with the diagnostic request, the method 500 flows YES to execute step 506. Diagnostic information about the two or more actions can be written into the diagnostic information. If there is no other action associated with the diagnostic request and, optionally, the diagnostic SOAP response message 114 is ready to be sent, the method 500 flows NO to end operation 512 where only the information from the first or those actions that were executed and logged is written into the diagnostic SOAP response message 208.

Figure 6:
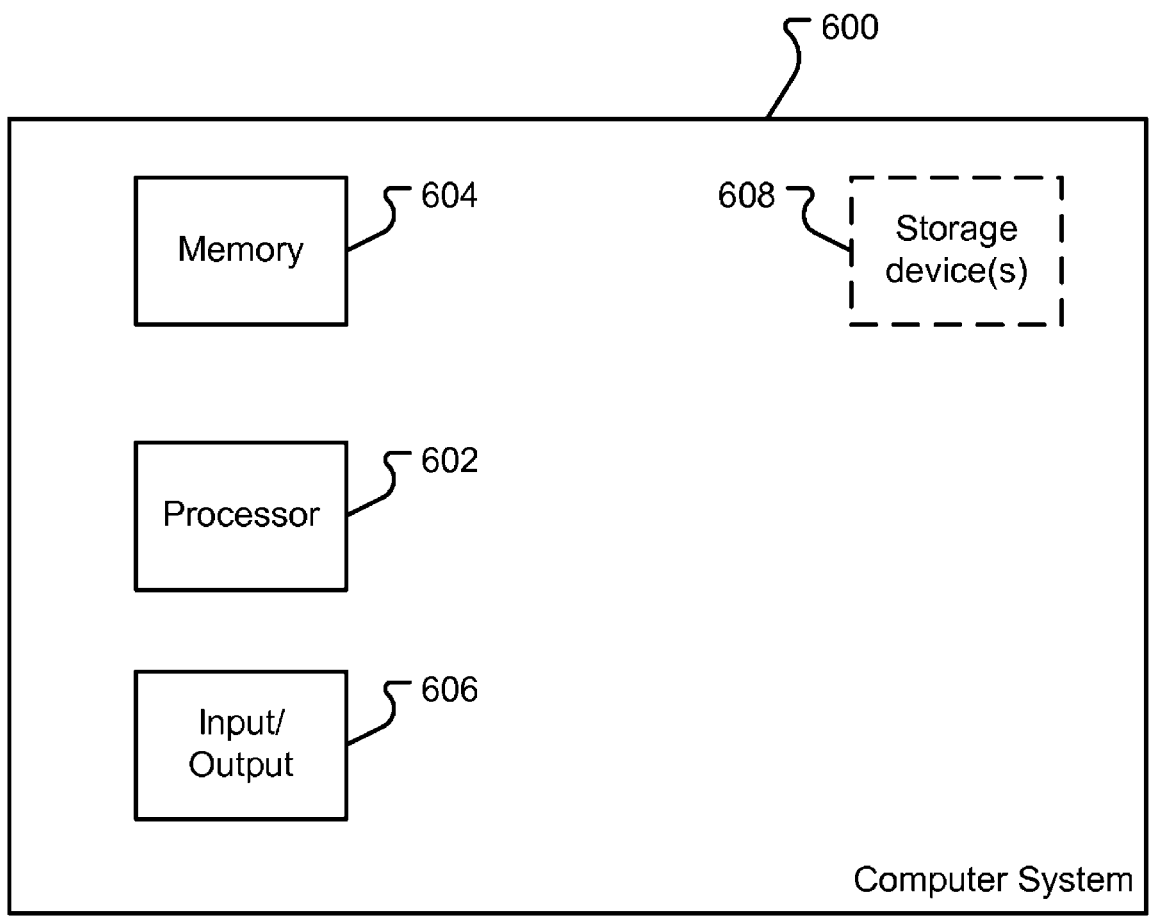
FIG. 6 is a block diagram of an embodiment of a computing system operable to function in one or more embodiments presented herein.

Embodiments of the different systems represented in this disclosure, which may include the web service client application 102 (FIG. 1) and the application server 106 (FIG. 1), may be a computer system, such as computer system 600 shown in FIG. 6. While a basic computer system is shown, one skilled in the art will recognize the configuration changes and/or modifications that may be required to make operable the systems (e.g., web service client application 102 (FIG. 1) and the application server 106 (FIG. 1), etc.) described herein. The computer system 600 comprises a processor 602, which completes the operations described in conjunction with FIGS. 3 through 5 or makes the systems operable as described in conjunction with FIG. 1. Further, the computer system 600 can execute functions in response to receiving the data structures described in FIGS. 2A-2B. The processor 602 may be any type of processor operable to complete the operations or implement the systems described herein. For example, the processor 602 may be an Intel Pentium processor, an ASIC, an FPGA, or other device.

The computer system 600 also comprises memory 604 to hold data or code being executed by processor 602. The memory 604 may permanently or temporarily store the instructions described in conjunction with FIGS. 3 through 5 or the data elements described in conjunction with FIGS. 2A-2B. Memory may be classified as a computer-readable medium, for example, RAM, ROM, magnetic media, optical media, etc.

The computer system 600 also can comprise software elements, including an operating system and/or other code, such as one or more application programs for recording diagnostics associated with a SOAP-requested web service executed in the web service client application 102 (FIG. 1) and the application server 106 (FIG. 1). The application programs may comprise computer programs described herein, and/or may be designed to implement methods described herein and/or configure systems described herein. Merely by way of example, one or more procedures described with respect to the method(s) discussed in conjunction with FIGS. 3 through 5 might be implemented as code and/or instructions executable by the computer system 600 (and/or the processor 602 within the computer system 600).

A set of these instructions and/or code might be stored on a computer-readable storage medium, such as the storage device(s) 608 or memory 604. In some cases, the storage medium might be incorporated within a computer system. In other embodiments, the storage medium might be separate from a computer system (i.e., a removable medium, such as a compact disc, etc.), and/or provided in an installation package, such that the storage medium can be used to program a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

Further embodiments of the computer system 600 comprise input/output (I/O) modules of systems 606. I/O systems 606 may include displays such as LCDs, plasma screen, cathode ray tubes, etc. The displays can provide a visual representation of data to a user. I/O system 606 may also include input devices such as mice, keyboards, touch screens, etc. Input devices allow the user to input information into the computer system. I/O systems 606 may also comprise communication systems such as wired, wireless, or other communication systems. Further, communication systems may communicate with peripheral devices, such as printers, modems, or other devices.

In light of the above description, a number of advantages of the present invention are readily apparent. For example, the systems allow for a user to diagnose problematic web services at a discrete level. Yet, the diagnoses do not slow the application server by eliminating the need to log all actions executed by the application server 106 (FIG. 1). Further, the diagnostics are coupled to the web service response. As such, the diagnoses are easy to read and interpret. Further, several levels of diagnosis are possible and help to further delineate the amount of scrutiny required.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. In some embodiments, a computing system may be used to execute any of the tasks or operations described herein. In embodiments, a computing system includes memory and a processor and is operable to execute computer-executable instructions stored on a computer-readable medium that define processes or operations described herein.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "computer-readable medium" or "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels and various other mediums capable of storing, containing or carrying instruction(s) and/or data.

Embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as a storage medium. A processor(s) may perform the necessary tasks. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While the principles of the invention have been described above in connection with specific apparatuses and methods, it is to be clearly understood that this description is made only by way of example and not as limitation on the scope of the invention.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

What is claimed is:

1. A test system for diagnosing errors in a web service, the test system comprising:
a web service client application, wherein the web service client application is configured to modify a SOAP request to include a request for diagnostics by adding a diagnostic request to a header of the SOAP request, receive a request for a web service, send a modified Simple Object Access Protocol (SOAP) message requesting a first web service and configured to display a diagnostic SOAP response;
an application server in communication with the web service client application, wherein the application server includes the first web service, the application server configured to receive the modified SOAP message, configured to log one or more actions associated with the modified SOAP message and write the logged actions into the diagnostic SOAP response, determine a type of diagnostics requested by reading a level of detail for logging, and configured to send the diagnostic SOAP response to the web service client application,
wherein the web service client is further configured to based on the determined type of diagnostics requested, receive a diagnostic SOAP response from the application server, read diagnostic information from a header of the diagnostic SOAP response, and present the diagnostic information to a user.

2. The test system as defined in claim 1, wherein the application server includes a hierarchy of secondary web services in communication with the first web service.

3. The test system as defined in claim 2, wherein the first web service is a parent service to the hierarchy of secondary web services.

4. The test system as defined in claim 3, wherein the application server logs at least one action associated with the hierarchy of secondary web services.

5. The test system as defined in claim 1, wherein the application server logs receipt of the modified SOAP message.

6. The test system as defined in claim 5, wherein the application server logs transmission of the diagnostic SOAP response.

7. The test system as defined in claim 1, wherein the web service client application is configured to request one of two or more levels of detail for the logging.

8. The test system as defined in claim 7, wherein a first level of detail requests the application server to log actions associated with the modified SOAP message and the diagnostic SOAP response.

9. The test system as defined in claim 8, wherein an intra-web service execution detail is included in the diagnostic response requested by the modified SOAP message.

10. A non-transitory computer-readable medium having sets of instructions for logging actions associated with a web service stored thereon which, when read by a computer, causes the computer to:
modify a SOAP request to include a request for diagnostics by adding a diagnostic request to a header of the SOAP request;
receive a request for a web service;
in response to receiving the request for the web service, send the modified SOAP request to an application server;
determine a type of diagnostics requested by reading a level of detail for logging;
based on the determined type of diagnostics requested, receive a diagnostic SOAP response from the application server, wherein the diagnostic SOAP response is a response to the modified SOAP request;
read diagnostic information from a header of the diagnostic SOAP response; and
present the diagnostic information to a user.

11. The non-transitory computer-readable medium as defined in claim 10, wherein a diagnostic request field further includes a selection for a level of detail for the logging.

12. The non-transitory computer-readable medium as defined in claim 11, wherein the sets of instructions which, when further executed by the computer, cause the computer to create a diagnostic SOAP response in response to reading the diagnostic request field.

13. The non-transitory computer-readable medium as defined in claim 12, wherein the diagnostic response message comprises:
a SOAP envelope field defining the diagnostic SOAP response;
a SOAP header field comprising a SOAP diagnostic field, the SOAP diagnostic field comprising diagnostic information associated with the web service; and
a SOAP body field including a response from the web service for the web service client application.

14. A method for diagnosing a web service, the method comprising:
an application server modifying a SOAP request to include a request for diagnostics by adding a diagnostic request to a header of the SOAP request;
a web service client application receiving a request for a web service;
in response to receiving the request for the web service, the web service client application sending the modified SOAP request to the application server;
the application server determining a type of diagnostics requested by reading a level of detail for logging;
based on the determined type of diagnostics requested, the web service client application receiving a diagnostic SOAP response from the application server, wherein the diagnostic SOAP response is a response to the modified SOAP request;
the web service client application reading diagnostic information from a header of the diagnostic SOAP response; and
the web service client application presenting the diagnostic information to a user.

15. The method as defined in claim 14, wherein the diagnostic information includes a log of two or more actions associated with the web service.

16. The method as defined in claim 14, further comprising:
an application server receiving the modified SOAP request;
the application server reading the request for diagnostics;
the application server executing an action associated with the web service;
in response to executing the action, the application server recording diagnostic information associated with the action;
the application server creating a diagnostic SOAP response;
the application server writing the diagnostic information associated with the action into the diagnostic SOAP response; and
the application server sending the diagnostic SOAP response to the web service client application.

17. The method as defined in claim 16, further comprising:
the application server determining if method level diagnostics is associated with the web service implementation;
if there is a method level action associated with the web service, the application server, in response to executing the method level action, recording diagnostic information associated with the method level action;
the application server writing the diagnostic information associated with the server level action and the method level action into the diagnostic SOAP response; and
if there is not a method level action associated with the web service, the application server writing only the diagnostic information associated with the server level action into the diagnostic SOAP response.

* * * * *

UNITED STATES PATENT AND TRADEMARK OFFICE
CERTIFICATE OF CORRECTION

PATENT NO. : 8,006,140 B2  
APPLICATION NO. : 12/436039  
DATED : August 23, 2011  
INVENTOR(S) : Khanna Page 1 of 1

It is certified that error appears in the above-identified patent and that said Letters Patent is hereby corrected as shown below:

Title Page, Item (56)

On page 2, in column 1, under "Other Publications", line 2-3, delete "$using_{13}$" and insert -- using --, therefor.

In the Drawings,

On Sheet 4 of 6, in figure 4, Box 416, line 2, delete "respone" and insert -- response --, therefor.

In column 4, line 49, delete "include" and insert -- included --, therefor.

In column 5, line 22, delete "SOAP-ENV:encodingSytle" and insert -- SOAP-ENV:encodingStyle --, therefor.

In column 7, line 11, delete "SOAP-ENV:encodingSytle" and insert -- SOAP-ENV:encodingStyle --, therefor.

Signed and Sealed this  
Twenty-ninth Day of November, 2011

David J. Kappos  
*Director of the United States Patent and Trademark Office*